May 20, 1941.  C. L. BAKER  2,243,027
MANUFACTURE OF ANHYDROUS SILICATES IN PUMICEOUS FORM
Filed Aug. 24, 1938
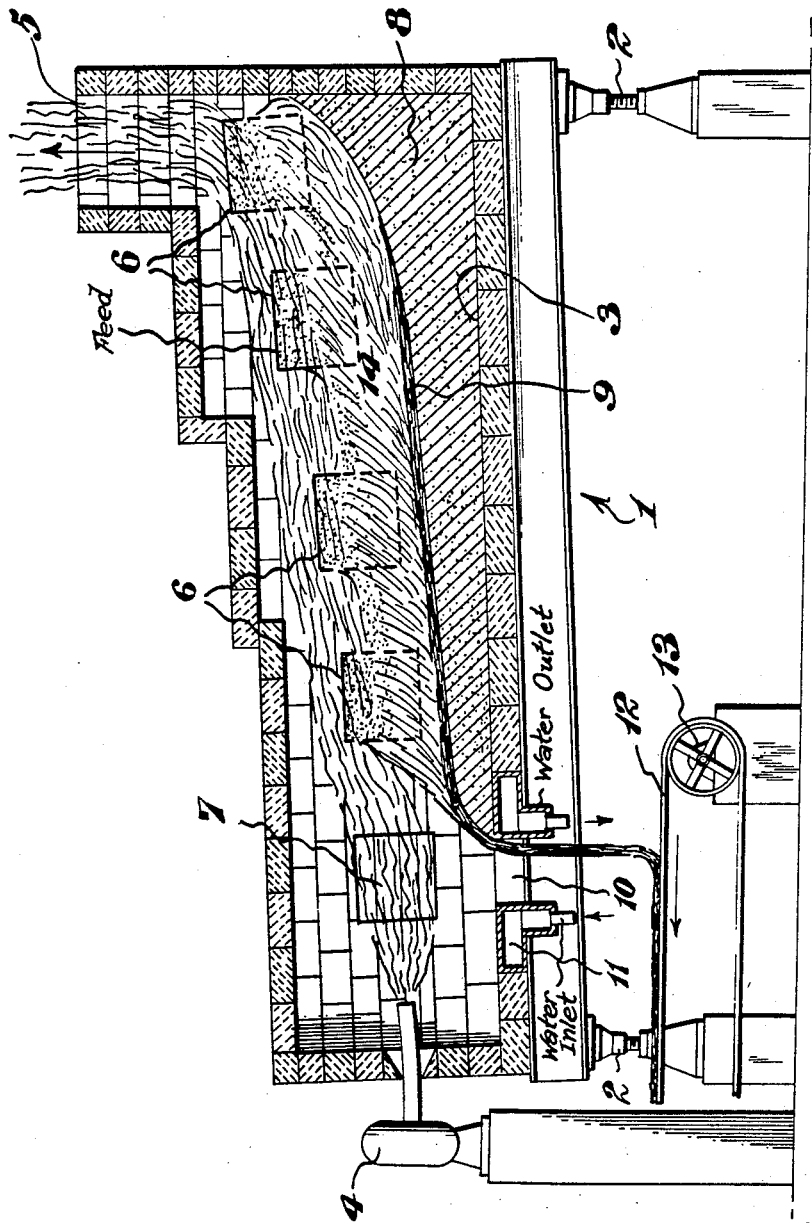
INVENTOR
Chester L. Baker
BY Henry C. Parker
ATTORNEYS

106 — 75

Patented May 20, 1941

2,243,027

UNITED STATES PATENT OFFICE 2,243,027

MANUFACTURE OF ANHYDROUS SILICATES IN PUMICEOUS FORM

Chester L. Baker, Penn Wynne, Pa., assignor to Philadelphia Quartz Company, Philadelphia, Pa., a corporation of Pennsylvania Application August 24, 1938, Serial No. 226,550

18 Claims. (Cl. 23—110)

This invention relates to manufacture of anhydrous silicates in pumiceous form; and it comprises a method of making alkaline metal silicates in intumescent or pumiceous form wherein a charge of raw materials, capable of fusing to form a crystallizable, alkaline metal silicate melt, is introduced into a furnace adapted to produce fusion of said charge, the resulting melt being discharged from the furnace while containing dissolved gases or materials capable of generating gases internally in sufficient quantity to produce the desired expansion or intumescence of the product during cooling and hardening of the melt; the gases producing said expansion advantageously comprising a volatile acid radical, such as $CO_2$, for example, which is derived from the alkaline metal salt during the chemical reaction which results in the formation of said silicate. One advantageous modification of this process comprises mixing silica with an alkali metal salt having an acid radical capable of being volatilized during the process, melting the resulting charge in a furnace, and discharging the resulting melt from said furnace before said acid radical has been completely volatilized, the cooling of said melt being controlled at a rate intermediate between that producing a clear glass and that producing a product containing large crystals and relatively large voids. My invention also includes the pumiceous alkali metal silicates produced by the described process, this product, when in bulk, resembling a fine grained bread in appearance having minute voids dispersed in a matrix of fine crystals and vitrified material, said product having a specific gravity substantially below that of dense products of the same composition and having a rate of solubility substantially equal to that of hydrated products of the same composition; all as more fully hereinafter set forth and as claimed.

There has long been a demand in this art for quickly-soluble, anhydrous alkali metal silicates having rates of solubility at least equal to those of the hydrated products which have, within the past few years, come into widespread commercial use. It has been found, for example, that sodium metasilicate pentahydrate dissolves with sufficient rapidity to permit its introduction directly into a laundry wash wheel as a soap builder and detergent. With the anhydrous products available heretofore this has been inadvisable owing to the slow rate of solubility of these products, whether in the form of glass particles or in the form of particles of crystallized anhydrous material. When these prior art materials have been employed in washing machines it has been found necessary to dissolve them before introducing them into the washing process. This has required additional equipment and expenditure of time with the result that these anhydrous products have found but little use in detergent operations even though they have obviously offered some economy in freight, packaging and storage costs.

Anhydrous alkali metal silicates have commonly been made heretofore in the so-called tank-type of furnace wherein the melt, which is produced by the fusion of sand and sodium carbonate or sodium sulfate, for example, is retained for some time prior to its discharge from the furnace. Retention of the melt in the furnace for a considerable period of time has been considered essential in order to properly refine the product and to produce a homogeneous product free from carbonates or residual sand grains, for example. The product obtained from such furnaces has been in the form of a viscous glass melt which has been cooled and subdivided as requirements have dictated. According to present practice the melt is usually discharged from the furnace into water, where it is quickly cooled to a highly fractured glassy condition known as a frit or cullet, or it may be discharged into large molds where it is allowed to cool slowly, this resulting, with the more siliceous products, in the formation of a glass, or in the case of the more alkaline products, in the formation of a hard crystalline product. For special uses the melt may be chilled between rolls to provide a glass in flake form. For most commercial purposes, however, it has been found necessary to convert the resulting anhydrous product into a hydrated form, or into the form of a solution. In either case it is necessary to dissolve the anhydrous product in water; an expensive and time consuming procedure.

I have found a simple and continuous method of making anhydrous alkaline metal silicates in the form of pumiceous or intumescent products having densities substantially less than that of prior art products of similar composition and degree of subdivision. The alkali metal silicates produced by this process are quickly soluble in water, having a rate of solubility substantially equal to that of the commercial hydrated products of otherwise corresponding composition. This result is accomplished by gas-expanding a crystallizable, alkaline metal silicate melt as it leaves the furnace and before it has had time to cool and harden. Gas expansion can be conveniently produced by the internal generation or evolution of one or more gases. This result can be accomplished by the introduction of special gas-forming materials into the melt or into the raw batch or, more advantageously by the use of alkaline metal salts in the raw batch which have acid radicals capable of being volatilized during the furnace reaction, the melt being withdrawn prior to completion of said volatilization and the rate of cooling of the melt being so controlled that the said volatilization produces the desired expansion of the product during cooling and before hardening. I have found that the chemical reaction may be entirely completed before the melt is withdrawn from the furnace and that it is merely necessary that this melt contain residual gases dissolved therein which are liberated or evolved during cooling and solidification of the melt with a consequent internal development of minute bubbles. The ideal point at which to withdraw the melt from the furnace, at least for most purposes, is after substantial completion of the chemical reaction but before the gases remaining dissolved in the melt have been substantially evolved.

The mechanism of the gas expansion phenomenon which is produced in my method is not entirely clear. It is evident, of course, that, if the melt is withdrawn from the furnace before the chemical reaction, which results in the formation of a gas, is completed, this reaction might proceed for a very short time while the melt was still at elevated temperatures. But it would be expected that the temperature of the melt would very quickly fall below reaction temperatures and, since it would also be expected that the gas would become more soluble in the melt at lower temperatures, it would seem highly unlikely that the small amount of gases produced by a continuing chemical reaction could possibly be effective in producing any substantial expansion of the produce. And it is evident that this explanation would not account for the expansion which is produced when the chemical reaction has been completed before withdrawal of the melt from the furnace. A different explanation seems to be required.

My observations with respect to the gas expansion produced in my invention lead me to believe that the true explanation of this phenomenon is that, as the melt undergoes crystallization the dissolved gases become less soluble owing to the formation of the crystals. It appears probable that the gases are substantially insoluble in the crystals themselves. It is therefore believed that the bulk of the gases which produce the gas expansion of my product are liberated or driven out of the melt by the growth of crystals in the melt. This is rather a rare phenomenon. And to the best of my knowledge, this is the first time that this phenomenon has been utilized to produce pumiceous alkaline metal silicates or other similar products.

There are several ways in which the desired gas expansion can be produced in my process. Various chemical compounds can be mixed with the melt or with the raw batch which are capable of generating gases at or slightly below furnace temperatures, that is within the range of about 900° to 1300° C. This generation of gases may result from the thermal decomposition of salts or oxides, for example, without chemical reaction or the evolution of the gas or gases may result from chemical reaction with the melt. If these materials are selected correctly and are of proper fineness, the melt will be saturated with gases as it leaves the furnace or additional gases may be generated for a short time within the cooling melt, these gases being sufficient to produce the desired gas expansion.

It is also possible to maintain the reaction chamber of the furnace under superatmospheric pressures, the furnace atmosphere containing one or more gases which are soluble in the melt, such as water vapor or any inert gas, for example, the pressure being lowered to atmospheric pressure or below as the melt leaves the furnace. The reduction in pressure caused in this manner produces the release or evolution of any dissolved gases in the melt in the form of minute bubbles. And these bubbles will then produce the desired gas expansion of the product. In this method it is merely necessary that the partial pressure of the gas, which is soluble in the melt, be higher inside the furnace than it is in the atmosphere into which said melt is discharged as it leaves the furnace.

Since it is usually desired to keep the silicate products as free from extraneous impurities as possible, it is usually more advantageous to produce gas expansion of the product by employing alkaline metal salts which have acid radicals which are volatilized during the chemical reaction required to produce the desired alkaline metal silicate, the volatilized radical then producing the desired gas expansion. If the resulting melt is discharged from the furnace before the reaction has been entirely completed or while the product contains gases dissolved therein, the desired expansion is produced while the cooling melt is still in a plastic state. This method eliminates the necessity of adding special gas forming ingredients. And it can be conducted with the chemicals which are most commonly employed in making alkaline metal silicates, namely, the carbonates, the sulfates, the chlorides, the nitrates and the phosphates, for example. If sulfates or phosphates are employed, it is desirable to add finely divided carbon to the charge to assist in the volatilization.

In my process it is highly desirable to employ a furnace with a sloping bed and to charge the same at a plurality of points at both sides. The more alkaline silicates are extremely fluid when melted, so that such a melt remains in the furnace for only a short time ranging from a few seconds to a few minutes. For best results a given increment of the melt should usually not remain in the furnace for more than about 15 minutes, when the volatilized acid radical is relied upon to produce gas expansion of the product.

The furnace may be fired from either end so that the batch is fused on its upper surface by contact with the hot gases and the heat radiated from the furnace roof. One important requirement of the furnace is that provision be made for prompt discharge of the melt once it is formed, which represents a distinct departure from the practice now employed in fusion processes.

By the use of the present method sodium silicates can be readily produced containing up to 2 moles of $Na_2O$ to 1 mole of $SiO_2$ or slightly higher. These silicates are substantially purer than those which can be produced by the usual furnace methods. The purity of silicates produced by my method is limited practically only by the purity of the sand, since the alkaline metal salts which are employed can be obtained substantially free from impurities.

The molten product from my furnace, if discharged directly into water or if quickly cooled, will form a dense glass. The explanation of this fact is, presumably, that no time is allowed for the generation of gases in the melt and that any gases formed become frozen in the solid in the form of a supersaturated solution. If discharged into large molds, the more alkaline melts will crystallize into a dense mass of large crystals. Such a crystallized mass may, however, be permeated with rather large size voids, caused by the internally evolved gas collecting in the form of large bubbles. The crystallized mass, therefore, is not as dense as that formed by usual procedures. In order to produce the desired expanded product of the present invention it is necessary to employ an intermediate cooling rate, that is, a rate which is intermediate between the rate producing a glass and that producing a substantially solid mass of crystals. Suitable control of the cooling rate is thus essential for the production of the desired results.

The rate at which the melt must be cooled to produce best results depends upon several factors. The composition and viscosity of the melt are, of course, of prime importance. With highly viscous melts, such as those containing more than two molecules of silica for each molecule of alkali metal oxide, it is almost impossible to produce gas expansion resulting in the formation of a pumiceous product. Such melts form glasses even upon slow cooling. In general it may be said that the more siliceous the melt the slower it should be cooled to produce maximum expansion. Fortunately the more siliceous melts are more highly viscous and this tends to prevent the evolved gases from escaping into the atmosphere. But whenever the composition of the melt is such as to produce a crystalline product when cooled slowly, my process will produce satisfactory results. The optimum rate of cooling can be determined readily by a simple experiment on the part of the operator.

With a product having a composition corresponding substantially to sodium metasilicate I have found that optimum results can be obtained by air cooling and running the melt into molds or on a cold surface to a depth varying from about ⅛ inch to 1 inch, the best product being obtained at intermediate depths. If the melt is discharged upon a belt conveyor having a heat-insulated surface, the speed of the belt can be varied readily to the point producing the maximum degree of expansion. The faster the belt is run, the thinner the layer produced and the greater the tendency to produce a glass rather than a crystalline product. But at suitable speeds intermediate between those producing a glass and those producing a dense crystalline product, the mass will puff up like rising bread and will yield a hard, pumiceous or vesicular product comprising minute bubbles entrapped in a finely crystalline matrix containing some vitrified material. The mass produced in this manner is usuallly snow white in color but may be slightly tinted if impurities are present. When this mass is crushed to a granular condition it dissolves in water with surprising ease. Best results are obtained when the cooling rate of the melt is adjusted to produce a product having maximum internal surface area per unit of weight. The products having the lower contents of $SiO_2$ are the more soluble, other factors being equal.

I have also found it possible to produce substantial gas expansion of my product simply by allowing the melt to flow or drop from the furnace on the floor or on a plate whereby it collects in the form of stalagmites which may be allowed to grow to a considerable side, weighing 100 pounds or over. The rate of cooling thereby produced, in the case of certain products, is substantially that producing maximum gas expansion. I have used this method successfully, for example, in making expanded sodium metasilicate in a furnace of moderate capacity.

My new method can be used for the production of any of the alkaline metal silicates, including aluminum silicates within this expression. Alkali metal silicates, and alkaline earth metal silicates, such as calcium and magnesium silicates, are examples of products which can be produced. Silicates of the alkaline earth metals are, of course, insoluble, but the pumiceous form produced by my product is useful for many purposes. The pumiceous calcium silicate product produced from limestone and silica by my process, for example, is useful as a raw material from which to make glass. Mixed silicates, such as sodium and calcium silicates and mixed sodium and aluminum silicates, for example, can be made satisfactorily by my method.

The compositions of the products which can be produced by my method are limited to some extent, as indicated above, by the fluidity of the melts produced in the furnace. Sodium silicates can be produced having molecular ratios of $SiO_2$ to $Na_2O$ varying from about 2 to 0.5 molecules of $SiO_2$ to 1 molecule of $Na_2O$, while potassium silicates can be made having contents of $SiO_2$ ranging up to about 2.5 molecules of $SiO_2$ to 1 molecule of $K_2O$. The suitability of my process for making pumiceous silicates of other compositions can be determined by a simple test designed to establish whether or not these silicate compositions crystallize upon slow cooling.

Products produced by the present invention can be made of differing densities by variation in the rate of cooling. I have prepared alkali metal silicate products, for example, having apparent specific gravities varying from about 0.5 to 2.5, when en mass, the latter value being substantially the specific gravity of the corresponding dense products. The apparent density of these products depends, of course, upon their porosity and granulation. For example, a sample having a composition corresponding to that of sodium metasilicate was found to have a specific gravity of about 1.8 when en mass but when crushed to pass a sieve having 4 mesh to the inch, its apparent specific gravity was reduced to about 1.25. This particular product was found to be quickly soluble in water as well as being easy to prepare and to use. Compositions containing substantially equimolecular proportions of $SiO_2$ and alkaline metal oxide appear in general to produce best results in my process.

When water is present in the raw batch, for example when water is present in the alkaline metal salt, either in the form of water of hydration or in the free state, this water remains dissolved in the melt to some extent and may contribute to the formation of the gases producing the pumiceous condition in the final product. Analysis of my products indicate, however, that they are substantially anhydrous, which shows that any moisture in the raw batch is substantially eliminated in the final product. If the melt remains in the furnace too long, as in prior art processes, the dissolved gases may partially escape from the melt before the latter leaves the furnace and hence are not available to produce the desired expansion of the melt during cooling.

The temperatures employed in my process can be varied over a considerable range but are advantageously maintained somewhat lower than in prior art processes for the reason that it is desired to retain sufficient gases in the melt to produce the desired expansion, whereas prior art processes have been conducted in such fashion as to eliminate these gases as far as possible. The temperature employed may be merely high enough to produce a melt of the required fluidity to readily flow out of the furnace. This method of operation affords an economy of heat. Of course, the higher the temperature employed, the more fluid the melt becomes and therefore the more quickly it flows out of the furnace; hence if conditions are adjusted correctly for one temperature, it is generally found that the temperature can be varied to some extent without producing any substantial change in the nature of the product produced. By way of example, it may be mentioned that, in the making of pumiceous sodium metasilicate products, furnace temperatures varying from about 1100° C. to 1300° C. have been found to give satisfactory results.

My invention can be described in somewhat greater detail by reference to the accompanying drawing which shows, more or less diagrammatically, a furnace which has been found satisfactory for performing the method and making the product of the present invention. The figure in the drawing is a vertical cross section through the furnace and through a bed of reaction materials in process of melting and reacting to form the silicate product of my invention.

The body 1 of the furnace is supported by means of jacks 2 which may be used to vary the inclination of the bed 3 of the furnace. The furnace shown is fired at the forward end by means of a gas or oil burner 4 and the combustion products escape through the vent 5 at the rear. The raw charge is fed along both sides of the furnace through the windows 6. The foremost window 7 is bricked up but serves to show the size and shape of the other windows. It will be noted that the windows towards the rear of the furnace are raised step by step above those towards the front of the furnace. This provides a sloping bed 8 of the raw charge on top of the floor of the furnace. When sufficiently heated by the combustion gases and by the radiation from the roof of the furnace, the raw charge melts and forms a molten stream 9 of reaction products which flows down the sloping bed formed by the raw charge eventually passing through the discharge port 10 which is provided in the bottom of the furnace. The discharge port is preferably made of metal and provided advantageously with a water jacket 11. It is desirable to discharge the melt on a belt conveyor 12 driven by a variable speed motor and reduction gear 13, in order that the rate of cooling of the melt can be controlled by the speed of the belt.

It will be noted that the surface 14 of the bed formed by the raw charge, which is exposed to the heat of the combustion gases, gradually fuses, the melt flowing down the sloping bed towards the centrally located stream 9. But fresh mixture is charged either continuously or intermittently at such a rate that there is always provided a rather thick bed 8 of raw charge.

In a specific embodiment of my invention a furnace of the nature of that shown in the drawing was employed. The charge was made by mixing soda ash and sand in the proportions of about 93 pounds of soda ash to 49.4 pounds of sand. This was initially charged through the side ports of the furnace before the furnace was heated, in amount sufficient to form a bed of charge on the bottom of the furnace of about the shape and depth shown in the drawing. The furnace was then fired with oil at the lower end. At the end of one hour and 50 minutes the furnace temperature had risen to 1100° C. and the molten sodium metasilicate reaction product commenced to flow from the exit port. This was collected on sheet iron in such manner that, upon cooling, it had a thickness of about 1 inch. This procedure was found to produce a satisfactory rate of cooling to cause expansion of the melt resulting in the formation of a pumiceous product. From time to time as the batch melted additional raw material was charged into the furnace and it was found that a highly satisfactory rate of production could be obtained in a continuous manner. The product obtained was in the form of a white, pumiceous, porous but very hard material. A lump of this product was found to have an apparent specific gravity of 1.78. After crushing it was found that a portion, which passed a 10 mesh sieve but was retained on a 14 mesh sieve, had an apparent specific gravity of 0.9. The analysis of this product was found to be as follows:

|  | Percent |
|---|---|
| $Na_2O$ | 49.40 |
| $SiO_2$ | 48.79 |
| $CO_2$ | 0.36 |
| Insoluble material | 0.62 |

This pumiceous product (1) was compared, as to the rate of solubility, with (2) a sample of crystalline anhydrous sodium metasilicate made by fusing $Na_2SiO_3.5H_2O$, (3) a sample of crystalline anhydrous sodium metasilicate made by fusing a mixture of sand and soda ash in an electric furnace, and (4) a commercial sample of sodium metasilicate pentahydrate. The results of this series of tests are collected in the following table.

|  | (1) Pumiceous $Na_2SiO_3$ | (2) Crystalline $Na_2SiO_3$ | (3) Crystalline $Na_2SiO_3$ | (4) $Na_2SiO_3.5H_2O$ |
|---|---|---|---|---|
| Vol. of sample__cubic centimeters__ | 30 | 30 | 30 | 30 |
| Weight_____grams__ | 27 | 30.1 | 32.7 | 25 |
| Molecular equivalent_____ | 0.221 | 0.247 | 0.268 | 0.118 |

APPARENT VOLUME REMAINING

|  | (1) Pumiceous Na$_2$SiO$_3$ | (2) Crystalline Na$_2$SiO$_3$ | (3) Crystalline Na$_2$SiO$_3$ | (4) Na$_2$SiO$_3$.5H$_2$O |
|---|---|---|---|---|
| Time elapsed: | | | | |
| 0 _____ cubic centimeters__ | 30 | 30 | 30 | 30 |
| 30 seconds _____ do ____ | 33 | 33 | -------- | -------- |
| 1 minute _____ do ____ | 30 | 33 | 30 | 23 |
| 2 minutes _____ do ____ | 26 | 33 | 31 | 19 |
| 3 minutes _____ do ____ | 23 | 32 | 31 | 17 |
| 4 minutes _____ do ____ | 19 | 31 | 31 | 14 |
| 5 minutes _____ do ____ | 16 | 30 | 31 | 12 |
| 6 minutes _____ do ____ | 14 | 29 | 31 | 10 |
| 7 minutes _____ do ____ | 11 | 29 | 30 | 9 |
| 8 minutes _____ do ____ | 10 | 29 | 30 | 8 |
| 9 minutes _____ do ____ | 9 | 29 | 30 | 7 |
| 10 minutes _____ do ____ | 8 | 29 | 30 | 6 |
| 11 minutes _____ do ____ | 7 | 28 | 30 | 5 |
| 15 minutes _____ do ____ | 6 | 24 | 29 | 4 |
| Approximate weight dissolved grams__ | 21.6 | 6.02 | 1.09 | 21.6 |
| Approximate molecular equivalents dissolved _____ | 0.177 | 0.049 | 0.009 | 0.102 |

The method used in comparing the rates of solubility was to crush the various samples and then screen them to pass a 10 mesh screen but to be retained on a 14 mesh screen. 30 cc. of each sample prepared in this manner were placed separately in 100 cc. graduated cylinders, the cylinders being then filled to the 100 cc. mark with distilled water. Once every minute the cylinders were inverted so as to bring the granules into suspension and then quickly returned to an upright position and allowed to stand. Readings of the volumes occupied by the solids in each cylinder were taken and recorded at the intervals noted in the left hand column of the above table. Since the figures in the vertical columns relate to the volumes occupied by the remaining solids, it is evident that the smaller these figures the greater the solubility.

In the next to the last line of the table, there is given the approximate weights of the various samples which dissolved in 15 minutes, while in the last line the approximate molecular equivalents dissolved within this time is given. It will be noted that my new pumiceous product has a rate of solubility which is substantially greater than that of the other anhydrous products and is substantially equal to that of the hydrated sample of column 4. The weights of these two samples which dissolved in 15 minutes was exactly the same, as indicated in the next to the last line of the table but the pumiceous sample showed a higher relative solubility, in the ratio of 177 to 102, if the comparison is based on the molecular equivalents dissolved, as shown by the figures given in the last line of the table. This rate of solubility for an anhydrous product is believed to be highly surprising. It is evident, therefore, that the new pumiceous product has novel and advantageous properties which distinguish it from other anhydrous products of like composition.

The new alkali metal silicate products can, of course, be dissolved in water and the solutions used in the preparation of hydrated crystalline products or for other purposes. But their rapid solubility adapts these products to be used directly without pre-solution in industrial applications such as in the washing of clothes, the washing of milk bottles, the scrubbing of floors, the cleaning of metals, the preparation of cements and many other purposes for which alkali silicates have been used previously.

While I have described what I consider to be the best methods of conducting my process, it is obvious, of course, that these methods can be varied to a considerable extent without departing from the purview of this invention. The furnace described, for example, while convenient in conducting my process, can be modified in various particulars. Even quite different types of furnaces can be employed. For example, if the reaction products are to be fused while in contact with an inert gas under pressure, which is soluble in the melt, and which is evolved during the cooling of the melt thereby expanding the product, it is desirable to employ a closed electric furnace provided with suitable means for discharging the melt to atmospheric or lower pressure without releasing the internal pressure in the furnace.

Gas expansion of the melt can be produced by various methods, as indicated previously. It is only necessary to employ some method whereby gases are developed internally and entrapped in the melt as the latter is cooling and before hardening. Various methods of cooling the melt at a rate producing maximum expansion can be employed but air cooling is, of course, the least expensive.

My method is capable of producing all types of alkaline metal silicates. Mixed silicates can be produced as well as mixtures of silicates with various detergent salts. When a raw charge is employed which contains approximately 2 molecules of sodium carbonate to 1 molecule of SiO$_2$, it is usually found that the product contains some unconverted sodium carbonate. The proportions of this unconverted material in the product can be controlled by the slope of the furnace floor, that is, by the length of time the melt remains in the furnace. In one particular furnace run, for example, I obtained a pumiceous product containing about 14 per cent of unconverted sodium carbonate. An unconverted residue of sodium carbonate of this nature is advantageous in detergents and also in ceramics and in metallurgy. It is possible to introduce other salts, such as phosphates or borates, into the charge, part or all of these salts remaining unconverted during the process. The resulting products are pumiceous and have rates of solution far above those which would be produced by ordinary fusion methods. The greater the quantity of unconverted material present in the process the greater the rate of solubility, other things being equal. Of particular importance is the product obtained by furnacing a mixture of sodium carbonate, sodium phosphate and sand in accordance with the present process. The carbonate is substantially completely converted but a substantial amount of the phosphate remains, appearing in the product presumably, as sodium pyrophosphate. This product has been found to be a valuable detergent.

It is also possible to use caustic alkalis instead of alkali salts in my process. If desired an alkali carbonate or the like may be added to produce additional gas expansion. The caustic alone however, produces some expansion, presumably because water vapor is evolved upon the heating of caustic with silica. I have found, for example, that pumiceous potassium silicates can be produced advantageously by employing as a charge a mixture of sand and caustic potash. With a small addition of potassium carbonate or sulfate a better expansion is produced. Other modifications which fall within the scope of the following claims will be immediately evident to those skilled in this art.

What I claim is:

1. In the process of manufacturing anhydrous alkaline metal silicates, the steps which comprise discharging a crystallizable melt of such a silicate from a reaction zone while containing dissolved gases and gas-forming constituents in quantity sufficient to generate gases internally upon slow cooling of said melt, and cooling said melt slowly at a rate producing the internal formation and entrapment of minute bubbles of said gases sufficient to gas expand said melt during cooling and crystallization and prior to hardening.

2. The process of claim 1 wherein said gas-forming constituents are the residues of an alkaline metal salt having an acid radical which is substantially volatilized during the process.

3. The process of claim 1 wherein said gas-forming constituents are the residues of a gas-forming ingredient added to the raw batch fed to said reaction zone, said raw batch comprising silica and an alkaline metal salt which reacts with said silica during said process with the formation of a crystallizable melt of an alkaline metal silicate.

4. The process of producing pumiceous alkaline metal silicates which comprises producing a crystallizable melt of an alkaline metal silicate containing gases dissolved therein, cooling and crystallizing said melt at a rate producing internal evolution and entrapment of said dissolved gases and the formation of a pumiceous product, said rate of cooling being intermediate that producing a clear glass and that producing a substantially dense mass of crystals.

5. In the process of manufacturing anhydrous, pumiceous alkaline metal silicates, the steps which comprise fusing in a reaction zone a mixture of an alkaline metal salt and silica having such a composition as to produce the formation of a melt of an alkaline metal silicate capable of crystallizing when cooled slowly, contacting said melt with a gas which is soluble in said melt under conditions producing solution of said gas in said melt, then passing said melt out of said zone under conditions tending to cause said dissolved gas to be evolved from said melt thereby causing said gas to form minute bubbles which become entrapped in said melt during cooling and crystallization thereof, whereby a pumiceous product having minute voids distributed in a crystalline matrix is produced.

6. The process of claim 5 wherein said inert gas is water vapor.

7. In the process of manufacturing anhydrous, pumiceous alkaline metal silicates, the steps which comprise fusing a mixture of silica and an alkaline metal salt having an acid radical capable of being volatilized during the process, said mixture having a composition producing the formation of a melt of an alkaline metal silicate capable of crystallizing when cooled slowly, passing said mixture into a reaction zone maintained at a temperature sufficiently high to produce said melt, then passing said melt out of said zone before complete volatilization of said acid radical and cooling and crystallizing said melt under conditions producing gas expansion of said melt prior to hardening.

8. The process of claim 7 wherein said alkaline metal salt is sodium carbonate and the silicate produced is a sodium silicate.

9. In the manufacture of anhydrous, pumiceous alkaline metal silicates, the process which comprises mixing silica with an alkaline metal salt, which reacts with said silica upon heating with the formation of a melt of an alkaline metal silicate, and also with a chemical compound producing a gas at temperatures reached during the following reaction, passing said mixture through a reaction zone and fusing and reacting said mixture in said zone; said mixture having a composition producing a melt forming crystals when cooled slowly; passing said melt out of said reaction zone prior to complete evolution of said gas from said melt and cooling at a rate intermediate that forming a glass and that forming a substantially solid crystalline mass, whereby said gas produces gas expansion of said melt during crystallization and prior to hardening.

10. The process which comprises mixing silica with an alkali metal carbonate in proportions ranging from about 2 to 0.5 molecules of silica to 1 molecule of alkali metal carbonate, continuously passing said mixture through a reaction zone and fusing and reacting said mixture in said zone, promptly passing the melt out of said reaction zone while still containing gases dissolved therein and cooling at a rate intermediate that producing a glass and that producing a substantial dense crystalline product thereby forming a gas expanded crystalline mass.

11. The process of claim 10 wherein said alkali metal carbonate is sodium carbonate and wherein the molecular proportions employed correspond substantially to 1 molecule of $SiO_2$ to 1 molecule of sodium carbonate.

12. The process which comprises establishing and maintaining a stream of an alkaline metal silicate in molten condition flowing through a reaction zone maintained at temperatures sufficiently high to keep said stream fluid, feeding said stream by introducing a mixture of silica and an alkaline metal salt capable of reacting with said silica to form said alkaline metal silicate at the sides of said flowing stream, the rate of feed being sufficient to cause said stream to be supported on a bed of said mixture, passing said stream out of said reaction zone while containing gas-forming ingredients and cooling said stream continuously at a rate intermediate between that producing a glass product and that forming a dense crystalline mass, thereby forming a pumiceous mass of alkaline metal silicate crystals.

13. The process which comprises establishing and maintaining a stream of molten, anhydrous sodium metasilicate flowing through a reaction zone maintained at a temperature sufficiently high to keep said stream fluid, feeding said stream by introducing a mixture of silica and sodium carbonate at both sides at a rate causing said stream to be supported on an unreacted bed of said mixture, passing said stream out of said reaction zone while still containing $CO_2$ dissolved therein and cooling and crystallizing said stream at a rate such that said $CO_2$ becomes entrapped in said melt in the form of minute bubbles, thereby producing a pumiceous mass of anhydrous sodium metasilicate crystals.

14. A new product consisting substantially of a pumiceous, anhydrous alkali metal silicate in the form of a congealed anhydrous melt, when in bulk resembling in appearance a fine-grained bread with minute bubbles dispersed in a matrix of fine crystals and vitrified material, said product having a density substantially below that of dense products of the same composition and containing not substantially more than about 2 molecules of $SiO_2$ to 1 molecule of alkali metal oxide.

15. As a new product, a pumiceous, anhydrous alkali metal silicate in the form of a congealed anhydrous melt, when in bulk resembling in appearance a fine-grained bread with minute bubbles dispersed in a matrix of fine crystals and vitrified material, said product being substantially completely soluble in water, having a bulk specific gravity substantially below that of a dense product of similar composition and ranging from about 0.5 to 2.5 and containing from about 2 to 0.5 molecules of $SiO_2$ to 1 molecule of alkali metal oxide.

16. A pumiceous, anhydrous sodium silicate in the form of a congealed anhydrous melt, when in bulk resembling in appearance a fine-grained bread with minute bubbles dispersed in a matrix of fine crystals and vitrified material, said product having a rate of solubility substantially equal to that of a dense hydrated product of the same granulation and ratio of $Na_2O$ to $SiO_2$, having a bulk specific gravity ranging from about 0.5 to 2.5 and containing from about 2 to 0.5 molecules of $SiO_2$ to 1 molecule of $Na_2O$.

17. A pumiceous, anhydrous sodium silicate in the form of a congealed anhydrous melt, when in bulk resembling in appearance a fine-grained bread with minute bubbles dispersed in a matrix of fine crystals and vitrified material, said product containing from about 2 to 0.5 molecules of $SiO_2$ to 1 molecule of $Na_2O$, having a specific gravity ranging from about 0.5 to 2.5 and having a rate of solubility of the order of that of a solid, hydrated product having a similar granulation and ratio of $SiO_2$ to $Na_2O$, the bubbles in said product resulting from the internal evolution of a gas in a melt of said product during cooling and crystallization and before hardening.

18. The product of claim 17 having a composition corresponding substantially to a sodium metasilicate.

CHESTER L. BAKER.